United States Patent [19]

Matschinsky

[11] Patent Number: 4,591,184

[45] Date of Patent: May 27, 1986

[54] WHEEL SUSPENSION FOR STEERABLE FRONT WHEELS OF MOTOR VEHICLES

[75] Inventor: Wolfgang Matschinsky, Munich, Fed. Rep. of Germany

[73] Assignee: Bayerische Motoren Werke AG, Munich, Fed. Rep. of Germany

[21] Appl. No.: 645,711

[22] Filed: Aug. 30, 1984

[30] Foreign Application Priority Data

Aug. 30, 1983 [DE] Fed. Rep. of Germany ....... 3331282

[51] Int. Cl.$^4$ .............................................. B60G 3/00
[52] U.S. Cl. .................................. 280/666; 280/673; 280/675; 280/696
[58] Field of Search ............. 280/666, 667, 668, 96.3, 280/663, 664, 660, 673, 675, 696, 695

[56] References Cited

U.S. PATENT DOCUMENTS

| 2,637,568 | 5/1953 | Booth et al. | 280/673 |
| 3,551,990 | 1/1971 | Wehner | 280/673 |
| 4,170,373 | 10/1979 | Beck et al. | 280/666 |
| 4,271,922 | 6/1981 | Kishline | 280/666 |

FOREIGN PATENT DOCUMENTS 868117 11/1963 Fed. Rep. of Germany.
2332387 1/1975 Fed. Rep. of Germany.

Primary Examiner—Richard A. Bertsch
Attorney, Agent, or Firm—Craig & Burns

[57] ABSTRACT

A wheel suspension for steerable front wheels of motor vehicles which includes a wheel carrier supporting thereon the wheel and a steering tie-rod engaging at the wheel carrier. The wheel carrier is pivotally connected with an upper cross guide member and a lower cross guide member which are each pivotally connected at the vehicle body or the like. The lower cross guide member cooperating with the support spring is supported at the vehicle body or the like by means of two pivot bearings disposed one behind the other in the vehicle longitudinal direction and is constructed torsion-resistant. The lower cross guide member is additionally connected at the other end by way of a corner-rigid pivot bearing having an essentially longitudinally extending pivot axis, with a coupling member, while the wheel carrier, in turn, is supported at the coupling member by way of an also corner-rigid pivot bearing having a vertical pivot axis. In order to obtain in particular a good weight returnability of the steering system, the pivot bearing of the wheel carrier at the coupling member is axially displaceable and additionally the wheel carrier and the coupling member are pivotally connected with an approximately vertical radius rod.

14 Claims, 3 Drawing Figures

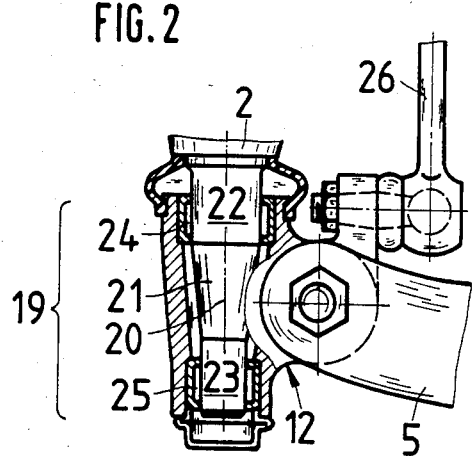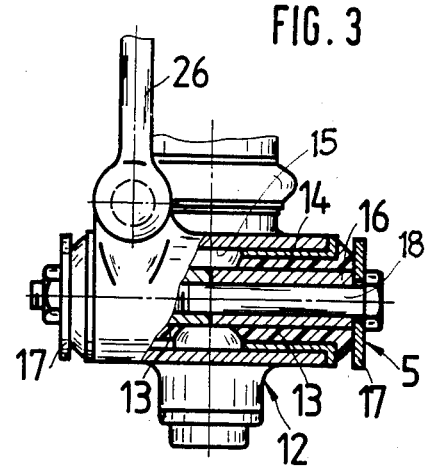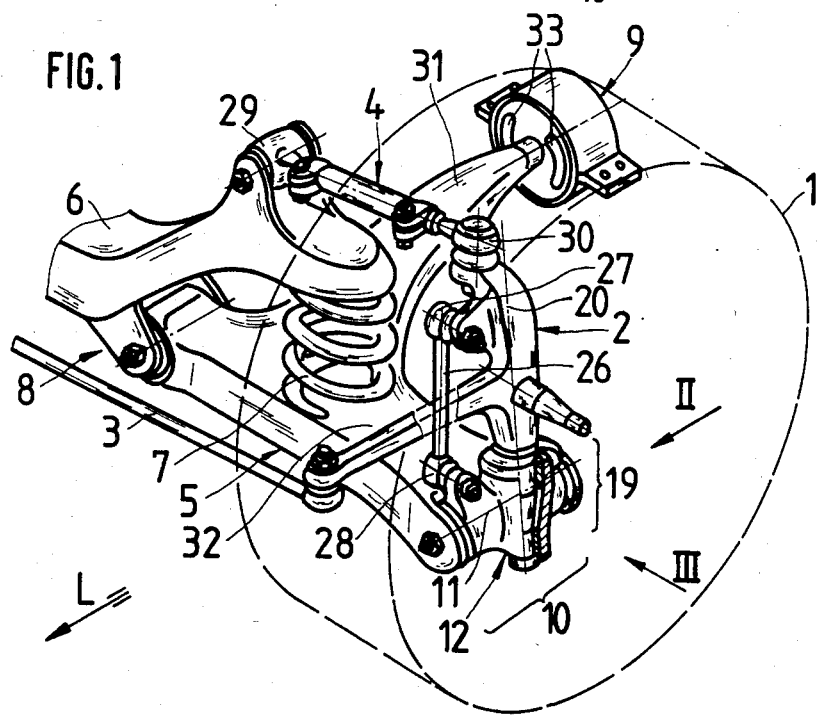

WHEEL SUSPENSION FOR STEERABLE FRONT WHEELS OF MOTOR VEHICLES

The present invention relates to a wheel suspension for the steerable front wheels of motor vehicles with a wheel carrier supporting thereon the wheel, at which engages a tie-rod and which is pivotally connected with an upper and with a lower cross guide member, each pivotally connected at the vehicle body or the like, whereby the lower cross guide member cooperating with the support spring is supported at the vehicle body or the like by means of two suspension link bearings disposed one behind the other in the vehicle longitudinal direction, is constructed torsion-resistant and is connected at the outer end thereof by way of a corner-rigid pivot bearing having an essentially longitudinally extending axis of rotation with a coupling member, on which, in turn, the wheel carrier is supported by way of an also corner-rigid pivot bearing having at least an approximately vertical pivot axis.

In a known axle of this type of construction (German Pat. No. 868,117), the upper cross guide member is replaced by two parallel tie-rods also acting as guide members. The lower cross guide member is constructed torsion-resistant in order to be able to absorb alone the occurring brake torques.

If one pivotally connects the cross guide members of such types of wheel suspensions or of customary wheel suspensions with double cross guide members (both, for example, of triangular guide member or control arm construction) in such a manner that for comfort purposes, a longitudinally elastic guidance of the wheel is assured, then problems arise because, in that case, each of the guide members has to be suspended in the longitudinal direction considerably softer than the desired (overall) longitudinal elasticity of the wheel. When brake forces occur, a strong "wind-up" of the wheel carrier about a cross axis results therefrom. Such a wheel suspension which is inadequately torsion-resistant about a cross axis with the described loads and stresses, leads to a considerable caster reduction, which is undesirable.

If, for example, a small or even a negative steering offset is desired in order to avoid a straining of the steering system in case of unilaterally effective brake forces, this can be made possible by a large angle of steering axis inclination. A large angle of steering axis inclinations produces during the steering a large change of the caster offset, especially a large difference of the caster offsets between outer and inner wheel. If for driving-dynamic reasons, the steering geometry is not designed according to the so-called Ackermann function (completely satisfactory rolling-off of all wheels during slow drive), the caster offset difference leads to lateral forces of the tires by reason of the track deviations and to an impairment of the automatic steering returnability during slow drives. If, in contrast thereto, one is able to keep the angle of steering axis inclination small, then, on the other hand, the weight returnability is again very small so that the centering of the steering, respectively, the straight drive also suffers.

The present invention is concerned with the task to provide a wheel suspension of the aforementioned type of construction which permits the aforementioned favorable design parameters without the opposite negative influences thereof and to assure thereby a good weight returnability.

The underlying problems are solved according to the present invention in a wheel suspension of the aforementioned type in that the pivot bearing is axially displaceable and in that the wheel carrier and coupling member are pivotally connected with an approximately vertical radius rod. Owing to these measures, the radius rod is positioned during a steering deflection at an inclination with respect to the essentially vertical pivot axis, about which the wheel carrier is rotatable with respect to the coupling member. This leads to the fact that the coupling member is pulled upwardly relative to the wheel carrier, which is possible by reason of the axial displaceability of the pivot bearing, and a lifting of the front part of the vehicle is effected during steering deflection. By appropriate selection of the length of the radius rod and of the distances of the points of engagement of the joints from the pivot axis, the extent of the lifting of the vehicle front part and therewith the extent of the weight returnability can be varied within a wide range.

It is already known in the art (German Offenlegungsschrift No. 23 32 387) to provide in a steerable double cross guide axles a threaded joint with a non-linear characteristic of the axial displacement between the lower cross guide member and the wheel carrier for purposes of obtaining a weight returnability; however, such a type of construction entails considerable disadvantages. Such threaded joints are practically uncontrollable over a longer part of the service life of the vehicle as regards wear, rattling, and freedom from play. Since a lifting of a vehicle front portion by several millimeters is required for a significant weight returnability, the threaded joint would have to have a considerable pitch which, however, would hardly be realizable by reason of the efficiency and especially also by reason of the already aforementioned wear. A threaded joint finally also entails the further significant disadvantage that one of the two steerable wheels could effect a partial lifting of the vehicle front portion while the other wheel, however, would simultaneously cause a lowering. Consequently, a significant lifting would hardly be possible. If one provides for that reason a threaded joint with a non-linear characteristic of the axial displacement, then such joints can be manufactured only with extraordinary difficulties.

These and other objects, features and advantages of the present invention will become more apparent from the following description when taken in connection with the accompanying drawing which shows, for purposes of illustration only, one embodiment in accordance with the present invention, and wherein:

FIG. 1 is a perspective view of one embodiment of a wheel suspension in accordance with the present invention;

FIG. 2 is a partial view in the direction of the arrow II in FIG. 1, partly in cross section; and FIG. 3 is a partial view in the direction of arrow III of FIG. 1, also partly in cross section.

Referring now to the drawing wherein like reference numerals are used throughout the various views to designate like parts, the wheel suspension for steerable front wheels of motor vehicles which is illustrated in FIG. 1 with its essential parts, includes a wheel carrier generally designated by reference numeral 2 supporting a wheel 1 (only schematically indicated); a tie-rod 3 engages at the wheel carrier 2—for producing the steering movement. The wheel carrier 2 is pivotally connected with an upper cross guide member generally designated by reference numeral 4 and with a lower cross guide member generally designated by reference numeral 5, which are both pivotally connected at the vehicle body or the like—in the illustrated embodiment at a cross bearer 6 to be secured at the vehicle body. The lower cross guide member 5 cooperating with the support spring 7 is supported at the already mentioned cross bearer 6 respectively (directly) at the vehicle body by means of two pivot bearings 8 and 9 disposed one behind the other in the vehicle longitudinal direction L. The vehicle body is also supported on the support spring 7 by way of the cross bearer 6.

The lower cross guide member 5 is constructed torsion-resistant. It is connected at its outer end with a coupling member generally designated by reference numeral 12 by way of a corner-rigid pivot bearing 10 having an essentially longitudinally extending pivot axis 11. The two rubber sleeves 13 arranged at a distance from one another and having lateral collars may thereby serve according to FIG. 3 as bearing elements, which are pressed into a longitudinal bore 15 of the coupling member 12 by interposition of an outer bearing sleeve 14. The rubber sleeves 13 include inner tubular sections 16, by means of which they are supported against one another and against lateral bearing eyes 17 of the lower cross guide member 5. A fastening bolt 18 extends through the bearing eyes 17 and the tubular sections 16.

The wheel carrier 2 is supported at the coupling member 12 by way of an also corner-rigid pivot bearing 19 having an approximately vertical pivot axis 20 for carrying out the steering movement.

The pivot bearing 19 is constructed axially displaceable. Two cylindrical bearing surfaces 22 and 23 disposed vertically one above the other are provided for that purpose according to FIG. 2 at a downwardly directed bearing pin 21 of the wheel carrier 2; in the illustrated embodiment, the bearing surfaces 22 and 23 cooperate with two needle bearings 24 and 25 accommodated in the coupling member 12.

The coupling member 12 and the wheel carrier 2 are additionally each pivotally connected with an approximately vertical radius rod 26. An upper ball joint 27 and a lower ball joint 28 are provided for the pivotal connection of the radius rod 26. The longitudinal axis of the radius rod 26 extends parallel to the pivot axis 20, about which the wheel carrier 2 can be rotated with respect to the coupling member 12.

During a steering movement of the wheel 1 out of the straight driving position indicated in FIG. 1, the radius rod 26 is inclined relative to the pivot axis 20 and the vertical distance of the ball joints 27 and 28 is reduced. The lower cross guide member 5 is pulled upwardly in this manner with respect to the wheel 1 and lifts the vehicle body by way of the support spring 7. This leads, on the other hand, to the already aforementioned good weight returnability after the release of the steering wheel.

As can be readily seen from FIG. 1, the upper cross guide member 4 is supported by means of a single joint 29, appropriately a rubber joint, at the cross bearer 6 (respectively, directly at the vehicle body). The upper cross guide member 4 may be adjustable in its length in order to be able to correct the camber of the wheel 1.

It can be seen further from FIG. 1 that the joint 30 on the side of the wheel of the upper cross guide member 4—a ball joint—is offset toward the vehicle interior with respect to the pivot axis 20, about which the wheel carrier 2 is pivoted with respect to the coupling member 12 during the steering deflection. This produces during the steering deflection from the straight driving position of the wheel 1, a superimposed camber change which so displaces the tire contact point that the caster offset change which is kept small anyhow by a small steering axis inclination, is additionally reduced, which is furthermore of advantage for the steering returnability. Even though this slightly reduces the weight returnability, this is inconsequential because a considerable weight returnability is realizable by the radius rod 26, described already in its function, on conjunction with the axially displaceable pivot joint 19.

The lower cross guide member 5 has an essentially angularly shaped configuration, as viewed in plan view, with a longitudinal arm 31 and a cross arm 32. In the illustrated embodiment, the longitudinal arm 31 is directed rearwardly opposite the driving direction. The pivot bearing 8 which is provided at the inner end of the cross arm 32 and approximately opposite the wheel center, is constructed relatively stiff whereas the pivot bearing 9 provided at the free rear end of the longitudinal arm 21 is constructed relatively soft in the horizontal direction, which is attainable in a known manner, for example, by apertures 33 on both sides in the bearing rubber of the pivot bearing 9. In case of longitudinal impacts which are absorbed alone by the lower cross guide member 5, the lower cross guide member 5 pivots about the relatively hard, forward pivot bearing 8 in an approximately horizontal plane because the rear pivot bearing 9 can yield horizontally to a certain extent. As a result thereof, the elastic longitudinal yieldingness of the wheel suspension is achieved which considerably improves the driving comfort.

Since the rear pivot bearing 9 is relatively hard in the vertical direction and by reason of the large support basis of the two pivot bearings 8 and 9 brake forces do not lead to any significant rotation of the lower cross guide member 5 about a cross axis and therefore the aforementioned "wind-up" can be avoided.

It can additionally be seen from FIG. 1 that the tie-rod 3 extends approximately parallel to the connecting line between the relatively hard forward pivot bearing 8 and the pivot axis 20, as viewed in plan view. This leads to the fact that the horizontally elastic wheel 1 which yields within limits during longitudinal impacts, does not experience any steering angle change during this movement.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A wheel suspension for steerable front wheels of motor vehicles, comprising wheel carrier means for supporting thereon a wheel, a tie-rod engaging at the wheel carrier means, an upper and a lower cross guide member, the upper and lower cross guide members being pivotally connected with the wheel carrier means and with a relatively fixed vehicle part, the lower cross guide member cooperating with a support spring being supported at the relatively fixed vehicle part by two pivot bearing means disposed one behind the other in the vehicle longitudinal direction and being constructed torsion-resistant, coupling means, said lower cross guide member being connected at the outer end thereof with said coupling means by way of a corner-rigid pivot bearing means having an essentially longitudinally extending pivot axis, the wheel carrier means being pivotally connected at said coupling means by way of an also corner-rigid pivot bearing means having an at least approximately vertical pivot axis, the last-mentioned pivot bearing means being axially displaceable, and the wheel carrier means and coupling means being pivotally connected with an approximately vertical radius rod.

2. A wheel suspension according to claim 1, wherein the longitudinal axis of the radius rod extends substantially parallelly to the at least approximately vertical pivot axis.

3. A wheel suspension according to claim 1, wherein the upper cross guide member is supported at the relatively fixed vehicle part by means of only a single joint means.

4. A wheel suspension according to claim 3, wherein the upper cross guide member is adjustable in its length.

5. A wheel suspension according to claim 3, wherein the joint means on the wheel side of the upper cross guide member is offset toward the vehicle interior with respect to the at least approximately vertical pivot axis.

6. A wheel suspension according to claim 1, wherein the lower cross guide member has an essentially angularly shaped configuration, as viewed in plan view, with a longitudinal arm and a cross arm, the pivot bearing means provided at the inner end of the cross arm and approximately opposite the wheel center being relatively stiff whereas the pivot bearing means provided at the free end of the longitudinal arm being relatively soft in the horizontal direction.

7. A wheel suspension according to claim 6, wherein the tie-rod, as viewed in plan view, extends at least approximately parallel to the connecting line between the relatively hard pivot bearing means and the at least approximately vertical pivot axis.

8. A wheel suspension according to claim 6, wherein the longitudinal axis of the radius rod extends substantially parallelly to the at least approximately vertical pivot axis.

9. A wheel suspension according to claim 8, wherein the upper cross guide member is supported at the relatively fixed vehicle part by means of only a single joint means.

10. A wheel suspension according to claim 9, wherein the upper cross guide member is adjustable in its length.

11. A wheel suspension according to claim 9, wherein the joint means on the wheel side of the upper cross guide member is offset toward the vehicle interior with respect to the at least approximately vertical pivot axis.

12. A wheel suspension according to claim 11, wherein the tie-rod, as viewed in plan view, extends at least approximately parallel to the connecting line between the relatively hard pivot bearing means and the at least approximately vertical pivot axis.

13. A wheel suspension according to claim 2, wherein the upper cross guide member is supported at the relatively fixed vehicle part by means of only a single joint means.

14. A wheel suspension according to claim 13, wherein the joint means on the wheel side of the upper cross guide member is offset toward the vehicle interior with respect to the at least approximately vertical pivot axis.

* * * * *